US009448358B2

(12) United States Patent
Tsukamoto et al.

(10) Patent No.: US 9,448,358 B2
(45) Date of Patent: Sep. 20, 2016

(54) MULTICORE OPTICAL FIBER AND MULTICORE OPTICAL FIBER CABLE

(71) Applicant: Mitsubishi Rayon Co., Ltd., Chiyoda-ku (JP)

(72) Inventors: Yoshihiro Tsukamoto, Toyama (JP); Takeshi Kitayama, Toyama (JP); Hideki Kihara, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 14/770,895

(22) PCT Filed: Apr. 1, 2014

(86) PCT No.: PCT/JP2014/059656
§ 371 (c)(1),
(2) Date: Aug. 27, 2015

(87) PCT Pub. No.: WO2014/163084
PCT Pub. Date: Oct. 9, 2014

(65) Prior Publication Data
US 2016/0011366 A1     Jan. 14, 2016

(30) Foreign Application Priority Data
Apr. 2, 2013   (JP) .................................. 2013-076828

(51) Int. Cl.
*G02B 6/02* (2006.01)
*G02B 1/04* (2006.01)

(52) U.S. Cl.
CPC ........... *G02B 6/02042* (2013.01); *G02B 1/046* (2013.01); *G02B 1/048* (2013.01)

(58) Field of Classification Search
CPC ... G02B 6/02042; G02B 1/046; G02B 1/048
See application file for complete search history.

(56) References Cited

U.S. PATENT DOCUMENTS 4,887,957 A * 12/1989 Ohta ......................... D01F 9/00
425/382.2
5,734,773 A * 3/1998 Teshima ................. G02B 1/045
385/123

(Continued)

FOREIGN PATENT DOCUMENTS

EP      2189830 A1     5/2010
JP      09-15432 A     1/1997

(Continued)

OTHER PUBLICATIONS

Machine translation of JP 11194220 A, Jul. 1999.*

(Continued)

*Primary Examiner* — Ryan Lepisto
(74) *Attorney, Agent, or Firm* — Morgan, Lewis & Bockius LLP

(57) ABSTRACT

Provided is a multi-core optical fiber which is capable of achieving the same level of light receiving capacity as that of a single-core plastic optical fiber, while being reduced in bending loss. A multi-core optical fiber according to the present invention has a plurality of cores and sea portions that are formed around each core. This multi-core optical fiber satisfies at least condition (1) or condition (2) below: (Condition 1): The occupancy rate of the total cross-sectional area of cores is 80~95% of the outer region in the cross section of a multicore optical fiber. (Condition 2): The occupancy rate of the total cross-sectional area of cores is 82~93% of the cross section of a multicore optical fiber.

12 Claims, 3 Drawing Sheets

(56) References Cited

U.S. PATENT DOCUMENTS

| | | |
|---|---|---|
| 6,188,824 B1 | 2/2001 | Teshima |
| 2008/0166091 A1* | 7/2008 | Aoyagi ............. G02B 6/02033 385/100 |
| 2010/0135622 A1 | 6/2010 | Sasho et al. |

FOREIGN PATENT DOCUMENTS

| | | |
|---|---|---|
| JP | 09-33737 A | 2/1997 |
| JP | 11-95048 A | 4/1999 |
| JP | 11-160553 A | 6/1999 |
| JP | 11-167031 A | 6/1999 |
| JP | 11-194220 A | 7/1999 |
| JP | 11194220 A * | 7/1999 ............... G02B 6/04 |
| JP | 2005-266742 A | 9/2005 |
| JP | 2006-215178 A | 8/2006 |
| JP | 2007-047371 A | 2/2007 |
| WO | 95/32442 A1 | 11/1995 |
| WO | 98/35247 A1 | 8/1998 |

OTHER PUBLICATIONS

International Search Report dated Jul. 8, 2014 for corresponding International application No. PCT/JP2014/059656.
Extended European Search Report issued in corresponding European Patent Application No. 14779336.8 dated Feb. 19, 2016.

* cited by examiner

MULTICORE OPTICAL FIBER AND MULTICORE OPTICAL FIBER CABLE

FIELD OF THE INVENTION

The present invention relates to a multicore optical fiber cable used as high-speed optical signal transmission lines in local area networks (LANs), factory automation (FA), office automation (OA) and the like.

BACKGROUND ART

In recent years, plastic optical fibers have been developed, providing advantageous features: they are inexpensive and lightweight fibers set with a greater diameter, and end-face processing and handling are easier to conduct. Plastic optical fibers have been used in various applications, for example, lighting, sensors, interior wiring such as FA, OA and LANs, and wiring in mobile bodies for short- to medium-distance communication systems such as automobile LANs.

When conventional single-core plastic optical fibers are bent with a smaller flexural radius, greater bending loss is observed. Multicore plastic optical fibers have been proposed to reduce bending loss by employing a structure where multiple cores are individually partitioned using cladding material (cladding). Also, to expand an application environment, there is demand for development of multicore plastic optical fibers with excellent heat resistance.

JP H11-95048A (Patent Publication 1) proposes a multicore plastic optical fiber cable that exhibits excellent heat resistance by using PMMA resin to make multiple cores, by forming cladding with a specifically formulated vinylidene fluoride-tetrafluoroethylene-hexafluoropropene copolymer, and by coating the optical fiber using vinylidene fluoride resin to provide protection.

JP H09-33737A (Patent Publication 2) discloses a method for reducing bending loss by setting a specific range for the difference in refractive indices between the cores and cladding of a multicore plastic optical fiber and for the ratio of cross-sectional areas between the core and cladding.

WO1995/32442 (Patent Publication 3) discloses a method for setting a specific range for the difference in refractive indices between the cores and cladding of a multicore plastic optical fiber so that transmission loss is minimized in a broader bandwidth and bending loss is also reduced.

WO1998/35247 (Patent Publication 4) discloses a technology capable of reducing bending loss and increasing the light receiving capacity by forming the cladding of a multicore plastic optical fiber to be double-layered with different refractive indices.

JP H11-160553A (Patent Publication 5) discloses a technology capable of reducing bending loss and increasing the light receiving capacity of a multicore plastic optical fiber by specifying the size of cross-sectional areas of the cores and by setting the shape of central cores to be hexagonal.

Moreover, to use plastic optical fibers as interior wiring systems of mobile bodies such as automobile LANs or aircraft LANs that require high heat-resistance properties, various materials are proposed for coating the exterior surface of a plastic optical fiber so as to provide heat resistance properties.

JP2006-215178A (Patent Publication 6) discloses a technology capable of enhancing heat resistance by coating plastic optical fibers with resin having polypropylene resin as its main component.

JP2005-266742A (Patent Publication 7) discloses technology capable of enhancing heat resistance by coating plastic optical fibers with water-crosslinked polyethylene.

PRIOR ART PUBLICATION

Patent Publication

Patent Publication 1: JP H11-95048A
Patent Publication 2: JP H09-33737A
Patent Publication 3: WO95/32442
Patent Publication 4: WO98/35247
Patent Publication 5: JP H11-160553A
Patent Publication 6: JP2006-215178A
Patent Publication 7: JP2005-266742A

SUMMARY OF THE INVENTION

Problems to be Solved by the Invention

In Patent Publications 1~4, each core is shaped to be closer to a circle, thus the ratio of cores to the entire fiber cross section cannot be raised. Accordingly, sufficient light receiving capacity is not achieved relative to that of a single-core plastic optical fiber. Especially, because of the portions occupied by the sea and cladding on the periphery, the amount of missed light increases when a light source with a high numerical aperture is used.

For that matter, the cores in Patent Publication 5 are in a polygonal shape so as to increase the cross-sectional area of the cores. However, since the cross section of each core is small, the light receiving capacity by each core remains small, making it unable to ensure sufficient light receiving capacity of the entire optical fiber.

Accordingly, a first objective of the present invention is to achieve the same level of light receiving capacity as that of a single-core plastic optical fiber by decreasing the amount of missed light caused by a multicore structure, while maintaining specific features of a multicore plastic optical fiber such as reducing bending loss.

Patent Publications 6 and 7 each describe technology about a single-core plastic optical fiber, and it is not clear if the same effects are achieved if applied on a multicore plastic optical fiber. Accordingly, a second objective of the present invention is to provide a multicore optical fiber cable that exhibits high heat resistance.

Solutions to the Problems

The aspects of the present invention are as follows.
[1] A multicore optical fiber is formed to have multiple cores and a sea portion formed around each core and to satisfy at least condition (1) or (2) below:
  (Condition 1): The occupancy rate of the total cross-sectional area of cores is 80~95% of the outer region in the cross section of a multicore optical fiber.
  (Condition 2): The occupancy rate of the total cross-sectional area of cores is 82~93% of the cross section of a multicore optical fiber.
[2] In the multicore optical fiber according to [1] above, both conditions (1) and (2) are satisfied.
[3] In the multicore optical fiber according to [1] or [2] above, the material for cores is a copolymer of polymethyl methacrylate or methyl methacrylate and at least one monomer other than methyl methacrylate.
[4] In the multicore optical fiber according to any of [1]~[3] above, the material for the sea portion is a fluorine-based resin containing at least a vinylidene fluoride unit, and having a crystal fusion heat of 70 mJ/mg or lower determined by differential scanning calorimetry.

[5] In the multicore optical fiber according to any of [1]~[4] above, at least one layer of cladding is formed on the periphery of each core.

[6] In the multicore optical fiber according to [5] above, the material for cladding contains at least a fluorinated methacrylate unit.

[7] A method for producing a multicore optical fiber according to [1] above by melt-spinning 82~93 mass % of the material for forming cores and 7~18 mass % of the material for forming the sea portion.

[8] A method for producing a multicore optical fiber according to [1] by melt-spinning 82~93 mass % of the material for forming cores, 0.1~8 mass % of the material for forming cladding, and 6.9~17.9 mass % of the material for forming the sea portion.

[9] The method for producing a multicore optical fiber according to [7] or [8] above by melt-spinning materials using a nozzle having nozzle holes arranged in a hexagonal array.

[10] A multicore optical fiber cable having a coating layer on the periphery of the multicore optical fiber according to any of [1]~[6] above.

[11] An optical communication system that uses the multicore optical fiber according to any of [1]~[6] above.

[12] An optical fiber sensor that uses the multicore optical fiber according to any of [1]~[6] above.

[13] An optical fiber light that uses the multicore optical fiber according to any of [1]~[6] above.

Effects of the Invention

The embodiments of the present invention provide a multicore optical fiber having the same level of light receiving capacity as that of a single-core plastic optical fiber while contributing to a reduction of bending loss. Also, the embodiments of the present invention provide a multicore optical fiber cable that exhibits high heat resistance.

DETAILED DESCRIPTION OF THE EMBODIMENTS

The following provides detailed descriptions of preferred embodiments of the present invention.

(1) Structure of Optical Fiber Related to the Present Invention

A multicore optical fiber according an embodiment of the present invention has multiple cores, preferably seven or more cores, and the sea portion formed around each core, and has a substantially circular cross section. It is more preferred to have 19 or more cores, especially preferably 19 cores.

In a multicore optical fiber related to the present invention, the sea portion surrounds each core. One layer or more of cladding may be formed between the cores and the sea portion.

Figure 3:
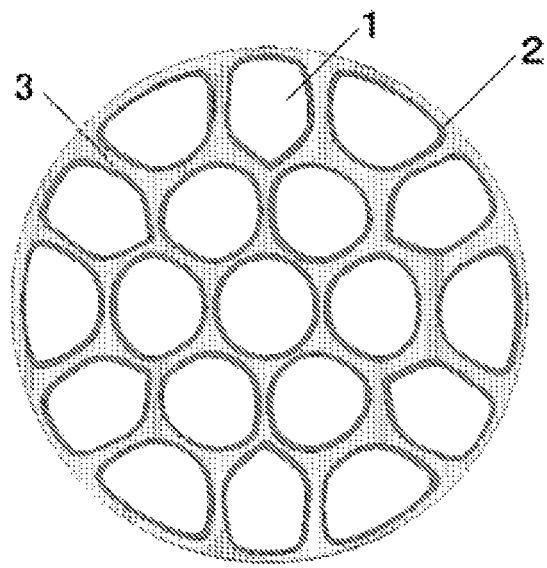
FIG. 3: is a cross-sectional view of a multicore optical fiber having cores, cladding and a sea portion.
Figure 4:
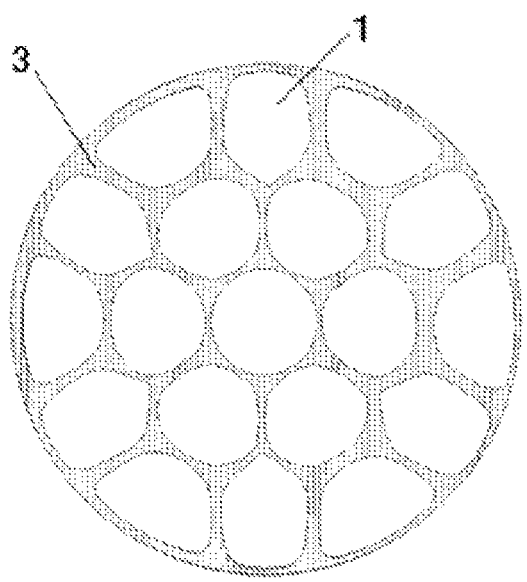
FIG. 4 is a cross-sectional view of a multicore optical fiber having cores and a sea portion.

For example, a multicore optical fiber may be structured having the cores, cladding and sea portion as shown in FIG. 3, or may be structured having the cores and sea portion as shown in FIG. 4.

A multicore optical fiber related to the present invention satisfies at least condition (1) or (2) below.

(Condition 1): The occupancy rate of the total cross-sectional area of cores is 80~95% of the outer region in the cross section of a multicore optical fiber.

(Condition 2): The occupancy rate of the total cross-sectional area of cores is 82~93% of the cross section of a multicore optical fiber.

Figure 2:
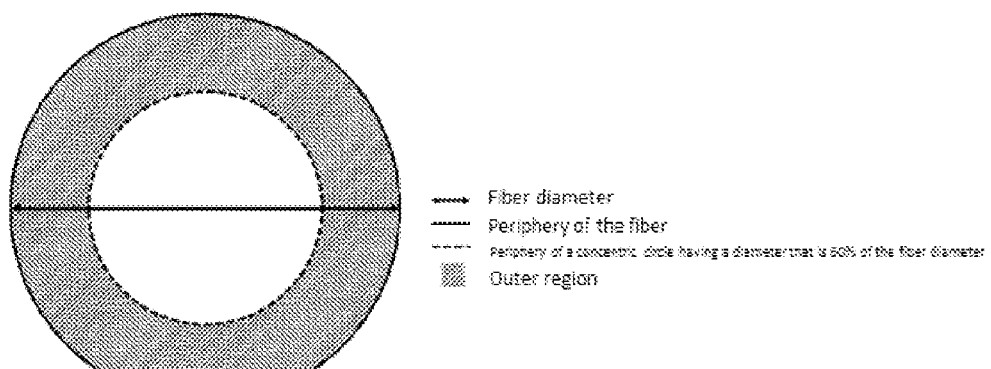
FIG. 2 is a cross-sectional view showing the outer region of a multicore optical fiber.

Here, the cross-sectional "outer region" of a multicore optical fiber is defined as follows: at the center of an optical fiber having a substantially circular cross section, when a concentric circle is formed to have a diameter that is 60% of the fiber diameter, the region sandwiched between the periphery of the concentric circle and the periphery of the fiber (sec FIG. 2). In the present application, a cross section of an optical fiber or a cross section of a core indicates a cross section perpendicular to a lengthwise direction of the fiber. The "occupancy rate of the total cross-sectional area of cores" in the outer region in the cross section of a multicore optical fiber is defined as the percentage of the total cross-sectional area of cores that occupies the outer region in the cross section of a multicore optical fiber to the entire area of the outer region in the cross section in the multicore optical fiber.

The occupancy rate of the total cross-sectional area of cores is preferred to be 81~90% of the outer region in the cross section of a multicore optical fiber. By setting the occupancy rate of the total cross-sectional area of cores to be 81% or greater of the outer region in the cross section of a multicore optical fiber, the same high level of light receiving capacity as that of a single-core optical fiber is achieved even when a light source with high numerical aperture is used. In addition, the rate of the total cross-sectional area of cores that occupies the outer region in the cross section of a multicore optical fiber is further increased when the diameter of cores in the array is reduced to increase the rate of cores that occupy the region. However, the light receiving capacity of each core with a smaller diameter will decrease. To secure the total light receiving capacity of the entire optical fiber, it is necessary for the occupancy rate of the total cross-sectional area of the cores to be 90% or lower of the outer region in the cross section of the multicore optical fiber.

In addition, the occupancy rate of the total cross-sectional area of cores in the cross section of a multicore optical fiber is defined as the percentage of the total cross-sectional area of all cores that occupy the cross section of a multicore optical fiber to the entire area of the cross section of the multicore optical fiber. The occupancy rate of cores in a multicore optical fiber is preferred to be 84~88%. When the total cross-sectional area of cores is set at 82~93%, sufficient light receiving capacity is achieved. By setting the occupancy rate of total cross-sectional area of cores at 82% or greater of the cross section of a multicore optical fiber, the same high level of light receiving capacity as that of a single-core optical fiber is achieved even when a light source with a high numerical aperture is used. In addition, the occupancy rate of the total cross-sectional area of cores in the cross-section of a multicore optical fiber is further increased when the diameter of cores in the array is reduced to increase the rate of cores that occupy the region. However, the light receiving capacity of each core with a smaller diameter will decrease. To secure the total light receiving capacity of an entire optical fiber, it is necessary for the occupancy rate of the total cross-sectional area of cores to be 93% or lower of the cross section of the multicore optical fiber.

In a multicore optical fiber related to the present invention, cores arranged on the outermost periphery are preferred to have at least two or more different shapes. The shapes are not limited specifically, and any shape may be employed. The shape may be polygonal, and each side may be straight or have a curvature. However, a rectangular or pentagonal ellipse is preferred.

(2) Cores

The material for forming cores in the multicore optical fiber related to the present invention is not limited specifically, and it may be glass or plastic. The core material is preferred to be plastic since plastic offers processability during a production process of an optical fiber and provides excellent mechanical characteristics. Either glass or plastic may be used in the present application. The following descriptions will be provided using plastic optical fibers (POFs).

In the embodiments of the present invention, the core material is preferred to be a copolymer of polymethyl methacrylate (PMMA) or methyl methacrylate (MMA) and at least one monomer other than methyl methacrylate. Even more preferred is a copolymer of at least one type of vinyl monomer and a methyl methacrylate monomer (hereinafter referred to as PMMA resin). It is especially preferred to use a PMMA resin that exhibits well balanced transparency and mechanical strength. When cores are made of the latter copolymer, the content of an MMA unit is preferred to be 50 mass % or greater, more preferably 60 mass % or greater, most preferably 70 mass % or greater, from the viewpoint of sufficiently securing transparency properties. As for the copolymerizable component of the MMA unit, monomer units, for example, methacrylate units or acrylate units that have been proposed as the material for plastic optical fibers (POF) may be properly selected.

(3) Sea Portion

In a multicore optical fiber related to the present invention, the material for forming a sea portion surrounding each core is preferred to contain at least a vinylidene fluoride (VdF) unit (hereinafter, such material is referred to as "vinylidene fluoride resin"), more preferably a vinylidene fluoride resin having a vinylidene fluoride unit and a tetrafluoroethylene (TFE) unit. A vinylidene fluoride resin having both a VdF unit and a TFE unit is preferred since its refractive index is low and it has excellent heat resistance along with excellent chemical resistance and shock resistance.

Examples of such a vinylidene fluoride resin are a copolymer of a VdF unit and a TFE unit; a copolymer of a VdF unit, a TFE unit and an HFP (hexafluoropropylene) unit; a copolymer of a VdF unit and an HFP unit; copolymers of a VdF unit, a TFE unit, an HFP unit, and a perfluoro(fluoro) alkyl vinyl ether unit; a copolymer of a VdF unit, a TFE unit and a perfluoro(fluoro)alkyl vinyl ether unit; a copolymer of a VdF unit, a TFE unit and a hexafluoroacetone unit, and the like. However, they are not the only options. A vinylidene fluoride resin is especially preferred to contain a VdF unit and an HFP unit, since such a resin has excellent transparency properties and is stable when POFs are produced by a melt-spinning method.

Particular examples of a copolymer are a binary copolymer consisting of 60~90 mass % of a VdF unit and 10~40 mass % of a TFE unit; a ternary copolymer consisting of 10~60 mass % of a VdF unit, and 20~70 mass % of a TFE unit and 5~35 mass % of an HFP unit; a ternary copolymer consisting of 5~25 mass % of a VdF unit, 50~80 mass % of a TFE unit, and 5~25 mass % of a perfluoro(fluoro)alkyl vinyl ether unit; a ternary copolymer consisting of 5~60 mass % of an ethylene unit, 25~70 mass % of a TFE unit, and 5~45 mass % of an HFP unit; a quaternary copolymer consisting of 10~30 mass % of a VdF unit, 40~68 mass % of a TFE unit, 21~40 mass % of an HFP unit, and 1~15 mass % of a perfluoro(fluoro)alkyl vinyl ether unit, and the like.

When a perfluoro(fluoro)alkyl vinyl ether unit (hereinafter referred to as an FVE unit) is added to a vinylidene fluoride resin having a TFE unit, the unit structure is represented by the following general formula (I).

$$CF_2=CF-(OCF_2CF(CF_3))aO-Rf_2 \quad (I)$$

(in the formula, "$Rf_2$" indicates an alkyl group, fluoroalkyl group, alkoxyalkyl group or fluoroalkoxy alkyl group having 1~8 carbon atoms, and "a" is a whole number of 0~3).

Especially, examples of an FVE unit are preferred to be any unit represented below.

$$CF_2=CFO(CF_2)_n-(OCF_3) \quad (II)$$

(in the formula, "n" is a whole number of 1~3)

$$CF_2=CF(OCF_2CF(CF_3))_nO(CF_2)_mCF_3 \quad (III)$$

(in the formula, "n" is a whole number of 0~3 and "m" is a whole number of 0~3)

$$CF_2=CFO(CH_2)_n(CF_2)_mCF_3 \quad (IV)$$

(in the formula, "n" is a whole number of 1~3 and "m" is a whole number of 0~3)

$$CF_2=CFO(CH_2)_nCH_3 \quad (V)$$

(in the formula, "n" is a whole number of 0~3)

As for the FVE units, from the viewpoints of cost performance, it is preferred to use at least one compound selected from a group consisting of $CF_2=CFOCF_3$, $CF_2=CFOCF_2CF_3$, $CF_2=CFOCF_2CF2CF_3$, $CF_2=CFOCH_2CF_3$, $CF_2=CFOCH_2CF_2CF_3$, $CF_2=CFOCH_2CF_2CF_2CF_3$, $CF_2=CFOCH_3$, $CF_2=CFOCH_2CH_3$, and $CF_2=CFOCH_2CH_2CH_3$.

However, if the crystallinity is high in a vinylidene fluoride resin having a TFE unit as above, transparency tends to be low. Accordingly, it is preferred to use a resin with a crystal fusion heat of 70 mJ/mg or lower.

The crystallinity of a vinylidene fluoride resin is shown as an index based on crystal fusion heat determined by differential scanning calorimetry (DSC). Crystal fusion heat indicates calories generated when crystalline components derived from a TFE unit and a VdF unit of a vinylidene fluoride resin are thermally fused. The greater the value is, the greater does the crystallinity of resin tend to be.

Especially, a crystal fusion heat of 70 mJ/mg or higher tends to cause a significantly cloudy result, thereby notably increasing initial transmission loss of a POF cable or transmission loss after the POF cable is kept under a high-temperature environment for a long duration.

If a crystal fusion heat is lower than 70 mJ/mg, a vinylidene fluoride resin exhibits relatively low crystallinity, and the transmission loss of the POF cable is suppressed from increasing even when it is kept under a high-temperature environment for a long duration. It is more preferred to be 50 mJ/mg or lower, even more preferably 20 mJ/mg or lower.

(4) Cladding

The resin for forming cladding in a multicore optical fiber related to the present invention may be selected properly from known materials used for POF cladding such as fluorinated methacrylate polymers and vinylidene fluoride polymers. In a POF cable related to the present invention, it is preferred to use a fluorinated methacrylate polymer having at least a fluorinated methacrylate unit because such a polymer makes it easy to adjust a refractive index, exhibits high transparency and heat resistance, and shows excellent flexibility and processability.

More specifically, an example of the above fluorinated methacrylate polymer is a copolymer that contains 15~90 mass % of fluoroalkyl (meth)acrylate unit (A) represented by formula (VI) below and 10~85 mass % of a copolymerizable monomer unit (B) and has a refractive index of 1.39~1.475.

$$CH_2=CX-COO(CH_2)_m(CF_2)_nY \quad \text{(VI)}$$

(in the formula, "X" indicates a hydrogen atom or a methyl group, "Y" indicates a hydrogen atom or a fluorine atom, "m" is 1 or 2, and "n" is a whole number of 1~12)

In addition, an example of a fluorinated methacrylate polymer for forming cladding is a polymer that contains 0~50 mass % of long-chain fluoroalkyl methacrylate unit (C) represented by formula (VII) below,

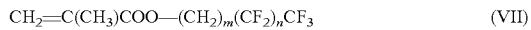
$$CH_2=C(CH_3)COO-(CH_2)_m(CF_2)_nCF_3 \quad \text{(VII)}$$

(in the formula. "m" is 1 or 2, and "n" is a whole number of 5~12) 0~50 mass % of short-chain fluoroalkyl methacrylate unit (D) represented by formula (VIII) below,

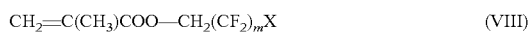
$$CH_2=C(CH_3)COO-CH_2(CF_2)_mX \quad \text{(VIII)}$$

(in the formula, "X" indicates a hydrogen atom or a fluorine atom, and "m" is a whole number of 1~4) and 50~80 mass % of other copolymerizable monomer unit (E).

Such a copolymer contains at least unit (C) or (D), and has a refractive index of 1.45~1.48. When such a polymer is used, the transmission bandwidth of a POF cable is set even wider.

Another example of the above fluorinated methacrylate copolymer contains 0~80 mass % of a long-chain fluoroalkyl methacrylate unit (C), 10~90 mass % of a short-chain fluoroalkyl methacrylate unit (D), and 10~50 mass % of other copolymerizable monomer unit (E), and its refractive index is 1.39~1.435. When such a polymer is used, bending loss of light is further reduced when a POF is bent.

On the other hand, if the refractive index of cladding is too high, it is useful to widen the transmission bandwidth, but the effects of suppressing bending loss of light by the sea portion tends to be insufficient. Therefore, it is preferred to formulate the cladding material within the above specified range so that a desired transmission bandwidth and effects of suppressing bending loss of light are obtained in the environment where a POF cable is used.

The other copolymerizable monomer unit (E) is not limited specifically. To enhance transparency properties, methyl (meth)acrylate units; to enhance mechanical characteristics, alkyl (meth)acrylate units such as ethyl (meth) acrylate and butyl (meth)acrylate; to enhance heat resistance properties, cycloalkyl (meth)acrylate units such as (meth) cyclohexyl acrylate, methyl cyclohexyl (meth)acrylate, (meth) bornyl acrylate, bornyl methacrylate, isobornyl (meth)acrylate, and adamantyl methacrylate; aromatic (meth)acrylate units such as phenyl (meth)acrylate and benzyl (meth)acrylate; hexafluoro neopentyl (meth)acrylate unit; N-substituted maleimide units such as N-methyl maleimide, N-ethylmaleimide, N-propyl maleimide, N-isopropyl maleimide, N-cyclohexyl malcimide, and N-phenyl-maleimidc; γ-butyrolactone compound units such as α-methylene-γ-butyrolactone, α-methylene-γ-methyl-γ-butyrolactone, α-methylene-γ, γ-dimethyl-γ-butyrolactone, α-methylene-γ-ethyl-γ-butyrolactone, and α-methylene-γ-cyclohexyl-γ-butyrolactone.

Among those listed above, methyl (meth)acrylate units are preferred to be used as other copolymerizable monomer unit (E) because a POF cable is obtained having transparency properties, long-term heat resistance in a temperature range of 100~105° C., and excellent mechanical characteristics.

In addition, to satisfy heat resistance at an approximate temperature of 100° C., the Tg of cladding is usually preferred to be at about 100° C. or higher. In a POF cable related to the present invention, even if cladding is formed using a known fluorinated methacrylate polymer with an approximate Tg of 70~90° C. long-term heat resistance is satisfied in a temperature range of 100~105° C.

A known fluorinated methacrylate polymer with an approximate Tg of 70~90° C. may be used not only for cladding but also for the other layer excluding the outermost layer when cladding is formed with two or more layers. Compared with a fluorinated methacrylate polymer with an approximate Tg of 100° C. or higher, when a Tg is 70~90° C., the flexibility of a fluorinated methacrylate polymer is high and is less likely to crack. Thus, when such a material is used for cladding, a POF cable with especially excellent bending properties is achieved.

(5) Coating Layer 1

For the coating material for forming a coating layer of a POF cable related to the present invention, it is preferred to use a resin that has excellent heat resistance, bending resistance and chemical resistance properties, shows excellent processability, has a proper fusion point, and is capable of coating a POF without reducing light transmission characteristics of the POF cable.

An example of such a resin to be used for at least the innermost coating layer is olefin-based thermoplastic elastomer (X) made of a resin component (F) containing a polypropylene resin as its main component and a proper amount of a rubber component combined therein. When measured in compliance with ASTM D-648, the thermal deformation temperature (a load of 4.6 kgf (45.1 N)) of such elastomer (X) is 90° C. or higher.

Examples of the resin component (F) are those containing polypropylene resin as the main component from the viewpoint of enhancing the heat resistance of a POF cable. More specifically, at least one selected from among polypropylene, propylene/ethylene copolymers, propylene/α-olefin copolymers and blended compositions of polypropylene and polyethylene. Especially, a blended composition of polypropylene (G) and polyethylene (H) is preferred because it is easy to adjust the level of heat resistance of a POF cable by properly selecting the ratio of combining the polymers (G, H). Also, when a resin mainly containing polypropylene resin is used, the temperature for forming a coating layer on a POF is set lower than 230° C., thereby suppressing a decrease in the optical characteristics of the POF that may occur during coating process. Here, polypropylene indicates isotactic or syndiotactic polypropylene, and polyethylene indicates low-density, medium-density or high-density polyethylene.

Regarding a blended composition of polypropylene (G) and polyethylene (H) described above, the ratio of polypropylene (G) and polyethylene (H) is selected properly according to the required temperature range for a POF cable. When a POF cable is used for a long duration at a temperature of 100° C. or higher, the resin component is preferred to be a mixture made of 30~100 parts by mass of polypropylene (G) and 0~70 parts by mass of polyethylene (H). When a POF cable is used for a long duration at a temperature of 125° C. or higher, the resin component is preferred to be a mixture made of 0~50 parts by mass of polyethylene (H) and 50~100 parts by mass of polypropylene (G). If the content of polyethylene (H) is too great, the heat resistance of the POF cable tends to be lowered, and thermal deformation is likely to occur at 100° C. or higher.

Meanwhile, preferred rubber components are at least one type of polymer selected from copolymers (J) mainly containing an ethylene and/or propylene unit and a non-conjugated diene unit, and copolymers (K) obtained by adding hydrogen to a copolymer (J). Examples of a copolymer (J) are block copolymers (N) consisting of a polymer block (L) mainly containing an ethylene and/or propylene unit and a polymer block (M) mainly containing a non-conjugated diene compound unit. Examples of a copolymer (K) are block copolymers (O) obtained by adding hydrogen to a block copolymer (N). Examples of a non-conjugated diene monomer are ethylidene norbornene, 1,4-hexadiene, dichloropentadiene or the like. However, that is not the only option. Especially, a ternary copolymer of ethylene/propylene/non-conjugated diene monomer exhibits effects as a rubber component to provide proper flexibility for a POF cable, while enhancing compatibility of polyethylene (G) and polypropylene (H) as the aforementioned resin components.

Also, since a copolymer (J) or (N) includes unsaturated bonds (carbon-carbon double bonds) in the main chain and has lower chemical stability such as heat resistance and weatherability, adding hydrogen to the aforementioned copolymer (J) or (N) means to hydrogenate the unsaturated bonds so as to convert the unsaturated bonds to stable saturated bonds. When hydrogenation reactions progress so as to decrease the remaining double bonds included in the main chain of the polymer, namely, as the rate of hydrogenation increases, properties such as heat resistance, chemical resistance and weatherability are more likely to improve in the coating layer.

In the olefin-based thermoplastic elastomer (X), a soft block as a rubber component having entropic elasticity is effective to make a flexible POF cable at room temperature, whereas a hard block as a resin component prevents its plastic deformation when the elastomer (X) exhibits the same behavior as that of a vulcanized rubber at low temperatures. In addition, at high temperatures, since the resin component does not soften until it reaches its crystal fusion point, it exhibits sufficient heat resistance along with flexibility and excellent processability. Also, since the elastomer (X) is thermoplastic, it shows the same processability as that of polyethylene and polypropylene. After a POF is coated, a complex post-crosslinking process is not required. Moreover, since the elastomer (X) is an olefin-based polymer and does not contain low molecular weight compounds that may migrate into functional groups or the POF, the properties of the POF cable for resisting hot wet conditions are enhanced.

The heat resistance and flexibility properties of an olefin-based thermoplastic elastomer (X) may be adjusted by modifying the ratio of combining the resin component and rubber component. For example, when a POF cable is used in such applications as in automobiles that require heat resistance at 100° C. or higher, or even at 125° C. or higher, a resin composition is preferred to combine a rubber component (for example, a block copolymer (N) and/or (O)) at 5~40 parts by mass, more preferably 10~30 parts by mass, based on 100 parts by mass of a resin component (a resin component (F) mainly containing polypropylene resin). If the content of a rubber component is increased, the heat resistance of a POF cable or molding stability when a coating layer is formed on a POF tends to decrease. If the content of a rubber component is low, a flexible POF cable cannot be obtained.

Moreover, the heat resistance of an olefin-based plastic elastomer (X) may be enhanced by crosslinking (vulcanizing) the copolymer (J) or (N). More specifically, the copolymer (J) or (N) is crosslinked (vulcanized) by adding a sulfur compound as a vulcanization agent (crosslinking agent), an organic peroxide as a crosslinking initiator, and if applicable, filler, vulcanization accelerator, vulcanization promoter and the like. A system that includes a combination of vulcanization agent (crosslinking agent), crosslinking initiator, vulcanization accelerator and vulcanization promoter is referred to as a vulcanization system. The amount and type of a vulcanization accelerator may be properly selected for the vulcanization system to be use, based on the structure and characteristics of a polymer, properties desired for the finished product, a method for forming a product and the like. Here, the vulcanization temperature needs to be at or higher than the decomposition temperature of the organic peroxide.

For sulfurs used as a crosslinking agent, there are sulfur oxide, deoxidized sulfur, powdered sulfur, precipitated sulfur, colloidal sulfur and the like. Among them, powdered sulfur is most used. The type of organic peroxide is selected according to the vulcanization method and the type of a crosslinking promoter. Examples of organic peroxide are benzoyl peroxide, dicumyl peroxide, 2,5-dimethyl-2,5-di(t-butylperoxy)hexane, 1,1'-di-t-butyl peroxy-3,3,5-trimethyl-ene cyclohexane, 1,3-di-(t-butylperoxy)-diisopropyl benzene and the like. Examples of a filler are barium sulfate, zinc oxide, carbonates, metal powder, a high density metal powder and the like. Examples of a vulcanization accelerator are sulfenamide compounds, thiuram compounds, dithiocarbamates, zinc butyl xanthate, thiourea-based compounds, thiazole-based compounds, aldehyde-ammonia-based compounds, and guanidine-based compounds. Examples of a vulcanization accelerator are stearic acid, zinc stearate and the like.

Examples of a commercially available olefin-based thermoplastic elastomer (X) are MILASTOMER (brand name) made by Mitsui Chemicals Co., THERMORUN (brand name), made by Mitsubishi Chemical Corporation, Sumitomo TPE (brand name), made by Sumitomo Chemical Co., Ltd. and the like. In addition, resins capable of satisfying heat resistance at 100° C. or higher, even at 125° C. or higher, required for automobile applications, are brand names: MILASTOMER series 5030B, 6030B, 7030B, 8030B, 9020B, 9070B. M2400B, M4400B, M2600B, M3800B, and M4800B, made by Mitsui Chemicals; THERMORUN series 3555B, 3655B, 3705B, 3755B, 3855B, 3981B, 3707B, Z102B, 5800B, 215B, Z101N, 5850N and TT744N, made by Mitsubishi Chemical; and Sumitomo TPE series 3000, 4000, 5000, 8000 and 9000, made by Sumitomo Chemical.

Also, as described above, an olefin-based thermoplastic elastomer (X) needs to have a thermal deformation temperature of 90° C. or higher (a load of 4.6 kgf (45. IN)) when measured in compliance with ASTM D-648. The thermal deformation temperature is more preferred to be 100° C. or higher, even more preferably 110° C. or higher, to satisfy a higher heat resistance level required for automobile applications. When the thermal deformation temperature is too low for a POF cable to be used under conditions of 100~105° C., the coating layer shows a notable deformation, thus resulting in lowered optical characteristics of the POF.

In addition, a melt flow index of the above olefin-based thermoplastic elastomer (X) is preferred to be 5~50. A low melt flow index tends to increase orientation distortion when a coating layer is coated on a POF. If the processing temperature is raised to suppress orientation distortion, thermal deterioration tends to occur in the POF. In addition, a high melt flow index tends to significantly decrease the strength of a coating layer, and may cause problems for use.

An olefin-based thermoplastic elastomer (X) may contain the following if applicable: antioxidants, light-shielding agents such as inorganic black pigment (for example, carbon black) to prevent incident light from entering the POF, inorganic or organic fillers such as talc, glass fiber, aromatic polyamide, carbon fiber, and so forth.

To further enhance durability or weatherability properties, a second coating layer made of thermoplastic resin may be provided on the periphery of the aforementioned coating layer (first coating layer).

Examples of the material for forming a second coating layer are vinyl chloride resin, polyethylene resin, polypropylene resin, chlorinated polyethylene resin, polyamide resin, polyurethane resin, fluorine resin, and ethylene/vinyl acetate copolymers. They may be used alone or in combination thereof, depending on the conditions for the POF cable. Especially when used as internal wiring in automobiles, the second coating layer is preferred to be materials with excellent oil resistance and heat resistance properties. More specifically, preferred examples are homopolymers such as nylon 11, nylon 12, nylon 6, nylon 66 and nylon 6-12, nylon copolymers obtained by combining monomer units of those polymers, nylon elastomers obtained by introducing a flexibility segment to those polymers, and polyamide resins mainly containing such elastomers. Among them, nylon elastomers and mixtures of a nylon elastomer and other polyamide resins are preferred since they have excellent moldability and are unlikely to exert thermal or mechanical damage to the POF cable.

(6) Coating Layer 2

As the coating material for forming a coating layer of a POF cable related to the present invention, water-crosslinked polyolefin resins may be used. Since water-crosslinked polyolefin resins exhibit excellent bending resistance, solvent resistance and processability, and a proper melting point, it is easier to coat a bare POF without decreasing the optical transmission characteristics of a POF cable.

When a POF cable is used in the engine room of an automobile, it is required to improve oil resistance and gasoline resistance in addition to long-term heat resistance. Thus, it is preferred to use a water-crosslinked polyethylene resin with a density of 0.935 $g/cm^3$ or higher.

In addition, the above water-crosslinked polyolefin resin may contain the following if applicable: antioxidants, additives such as inorganic black pigments, for example, carbon black, to prevent incident light from entering the POF, fillers such as talc, glass fiber, aromatic polyamide and carbon fiber, and so forth.

A water-crosslinked polyolefin resin is formed as follows, for example: a polyolefin resin as a base polymer is mixed in and kneaded with a compound having a crosslinkable functional group such as an alkoxysilane group; a water-crosslinkable polyolefin precursor resin is formed by graft-polymerizing or copolymerizing (silylation) the mixture; then the precursor is reacted with moisture or the like in the presence of a silanol condensation catalyst to produce —Si—O—Si— bonds.

Examples of a base polymer of a water-crosslinked polyolefin resin are low-density, medium-density or high-density polyethylene resins, isotactic or syndiotactic polypropylene resins, copolymers, block polymers or blended mixtures of such resins.

For a POF cable related to the present invention, a fluorinated olefin-based resin containing an HFV unit and FVE unit is used for the outermost layer of the sea portion, and a coating layer made of the aforementioned water-crosslinked polyolefin resin is further formed on the periphery of the outermost layer so that the adhesiveness of the coating layers to the POF is enhanced. By enhancing the adhesiveness of the coating layer and the POF, a terminal-forming process is simplified when a plug or the like is fixed to an edge of a POF cable because it is easy to tighten and fix the plug or the like from above the coating layer. Also, such a structure prevents damage to or breakage in a POF cable when vibrations or the like are exerted on the POF cable.

In addition, by enhancing the adhesiveness of the coating layer and a POF, dimensional change such as protrusion and retraction (pistoning) of the POF relative to the coating layer is sufficiently prevented.

(7) Method for Producing Multicore Optical Fiber of the Present Invention

Figure 1:
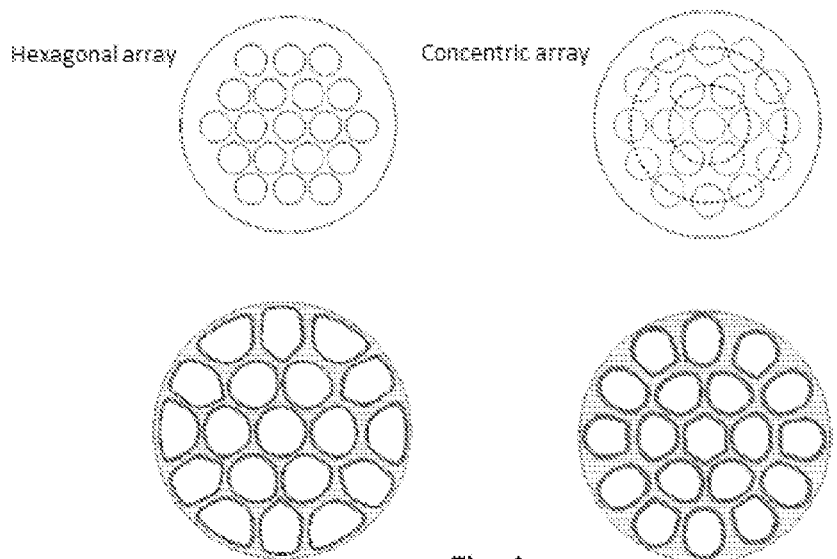
FIG. 1 is a view showing the difference between nozzle cross-sectional shapes and the obtained fiber cross sections.

Any known method may be employed for producing a multicore optical fiber related to the present invention, and especially preferred is a melt spinning method for producing a multicore optical fiber using a combined apparatus for melting and spinning. First, components for forming cores, components for forming cladding if applicable, and components for forming the sea portion are prepared. Spinning nozzle holes corresponding to the number of cores are arranged in a hexagonal array, for example, so that the center of each nozzle is positioned at the lattice point of a triangular lattice and the lines connecting the centers of nozzle holes positioned on the outermost array form a regular hexagon (see FIG. 1, cross-sectional shape of a nozzle in a hexagonal array). In another example, spinning nozzle holes are arranged in a concentric array (see FIG. 1, cross-sectional shape of a nozzle in a concentric array). Materials for forming cores, cladding and sea portion are supplied to the nozzle to form a multiple-core/cladding/sea structure. Simultaneously or subsequent to the formation of the core/cladding/sea structure, the structure is integrated and a protective layer is provided if applicable. Then, the integrated structure is stretched to complete an optical fiber related to the present invention.

The spinning nozzle is preferred to have a hexagonal array, since the rate of the total area of cores that occupy the outer region in the cross section of a multicore optical fiber is increased.

In the present invention, it is preferred to melt spin 82~93 mass % of the core material and 6.9~18 mass % of the sea material. It is more preferred to melt spin 82~93 mass % of the core material, 0.1~8 mass % of the cladding material and 7~17.9 mass % of the sea material.

When a multiple-core/cladding/sea structure is integrated, a die is used for adhering parts of the core/cladding/sea structure to each other so that the gaps between them disappear and a hexagonal core portion is formed. The die used for integration is preferred to have a cylindrical or funnel shape with a circular end surface.

The above-produced optical fiber is stretched after the above process. The stretching ratio is 1.2~4 times the original length, and is adjustable within a range that satisfies the required optical properties and mechanical characteristics. To heat and cool the optical fiber during the stretching process, in addition to a method for using hot air, heating by a far-infrared radiation, heating by using hot liquid such as hot water or the like may also be employed.

To obtain a POF cable related to the present invention, generally used methods for forming a coating layer may be employed to form a coating layer on the periphery of a POF. To fully exhibit the effects of the present invention, it is preferred to use a crosshead die for a water-crosslinkable polyolefin precursor resin.

As a water-crosslinkable polyolefin precursor resin to be used for forming a coating layer, it is preferred to have a melt flow index of 5~20. When the melt flow index is less than 5, orientation distortion tends to increase when a coating layer is formed on a POF, and when the processing temperature is increased to suppress such orientation distortion, the bare POF tends to show thermal deterioration. On the other hand, if the melt flow index exceeds 20, the strength of a coating layer tends to decrease.

After a water-crosslinkable polyolefin precursor resin is coated on a POF using the aforementioned method, the precursor resin is crosslinked by applying moisture. To conduct such a crosslinking treatment efficiently within a short period of time, it is preferred to expose the POF cable in hot steam or hot water.

Especially, if hot water is used, heat efficiency is notably excellent compared with using hot steam. Thus, a crosslinking treatment is performed within a significantly short period of time so as to avoid thermal deterioration of the POF. Accordingly, the initial optical transmission characteristics of a POF cable do not decrease after the crosslinking treatment. In addition, using hot water allows sufficient relaxation treatment to be conducted on a POF that was stretched during the spinning process. Accordingly, the dimensional stability of a POF cable is also enhanced.

The temperature for conducting water-crosslinking treatment is preferred to be 90° C. or higher, more preferably 95° C. or higher. A temperature lower than 90° C. may require a notably longer duration for sufficient water-crosslinking reactions. In addition, a crosslinking treatment may also be conducted under pressurized conditions using an autoclave or the like to apply a temperature exceeding 100° C., which is the boiling point of water. It is preferred to conduct such a method at a temperature of 120° C. or lower so as not to cause a decrease in the strength of the POF derived from a lowered stretching orientation of the POF.

The duration of a crosslinking treatment using hot water is set according to the temperature of the hot water. For example, if the water temperature is 95~98° C., the duration is preferred to be within a range of 30 minutes to six hours or shorter, more preferably within a range of three to four hours. If the treatment duration is shorter than 30 minutes, crosslinking reactions in the coating layer and relaxation of the POF cable are insufficient, and dimensional changes such as thermal contraction and pistoning tend to occur in the POF cable. On the other hand, if the duration is longer than six hours, relaxation of the POF cable is excessive, causing a decrease in the optical transmission characteristics of the POF cable.

(8) Other Embodiments

Another embodiment of the present invention is an optical communication system that uses a multicore optical fiber related to the present invention. The optical communication system of the present invention is not limited specifically, except that the system uses a multicore optical fiber related to the present invention, and is formed by any known conventional method.

Yet another embodiment of the present invention is an optical fiber sensor that uses a multicore optical fiber related to the present invention. The optical fiber sensor of the present embodiment is not limited specifically, except that the sensor uses a multicore optical fiber related to the present invention, and is formed by any known conventional method.

Yet another embodiment of the present invention is an optical fiber light that uses a multicore optical fiber related to the present invention. The optical fiber light of the present embodiment is not limited specifically, except that the optical fiber light uses a multicore optical fiber related to the present invention, and is formed by any known conventional method.

EXAMPLES

In the following, a POF cable related to the present invention is described by referring to the examples. The evaluation results of the examples are obtained by conducting the following evaluation methods.

(Crystal Fusion Heat ($\Delta H$))

A differential scanning calorimeter (DSC) (DSC-220, made by Seiko Instruments Inc.) was used for measurements. The temperature of a sample was raised at a rate of 10° C./min. to reach 200° C., and kept there for 5 minutes to fuse the sample. Then, the temperature of the sample was lowered at a rate of 10° C./min. to 0° C. The treatment was repeated again, and the crystal fusion heat was determined at that time.

(Transmission Loss)

Using a light with a wavelength of 650 nm and excitation NA=0.1, transmission loss was determined using a 25-1 m cutback method. The initial transmission loss of a POF cable was determined, and then the transmission loss was measured after the POF was kept in a 105° C. oven for 3000 hours.

Example 1

Figure 5:
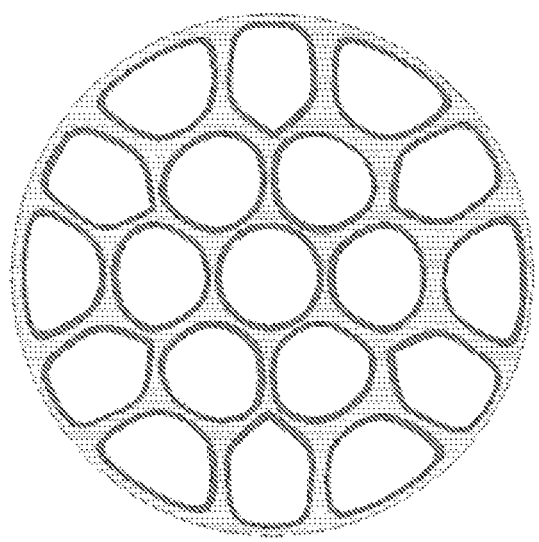
FIG. 5 is a cross-sectional view of a multicore optical fiber in Example 1.

The material for cores was PMMA (refractive index of 1.492), the material for cladding was a copolymer (FMI) of 2,2,2-trifluoroethyl methacrylate (3FM)/2-(perfluorooctyl) ethyl methacrylate (17FM)/MMA/methacrylic acid (MAA) (51/30/18/1 mass %) (refractive index of 1.417), and the material for the sea was VdF/TFE/HFE (48/43/9 mass %) (refractive index: 1.375, crystal fusion heat: 14 mJ/mg). Then, 86 mass % of the core material, 5 mass % of the cladding material and 9 mass % of the sea material were melted and supplied to a spinning head of 220° C. A spinning nozzle with 19 nozzle holes arranged in a hexagonal array and a funnel-shaped die were combined for spinning. Then, the POF was stretched to double the length, and a multicore plastic optical fiber having 19 optical transmission cores was obtained. The occupancy rate of the total cross-sectional area of cores was 86.6% of a cross section of the multicore optical fiber, and the occupancy rate of the total cross-sectional area of cores was 81.6% of the outer region in the cross section of the multicore optical fiber. The shape of cores in contact with the periphery of the optical fiber was a rectangular or pentagonal ellipse. FIG. 5 shows a schematic cross-sectional shape of the obtained multicore plastic optical fiber.

A 2.2 mm-diameter optical fiber cable obtained by coating polyethylene on the periphery of the multicore plastic optical fiber was cut into 1 m lengths. Incident light with a wavelength of 650 nm entered the multicore plastic optical fiber at numerical apertures (NA) of 0.1 and 0.65 respectively from one end of the optical fiber, and the amount of emitted light from the other end was measured. The amounts of emitted light of the multicore plastic optical fiber were 249.2 nA (P 0.1) and 219.4 nA (P 0.65) respectively, and the ratio of the amounts of transmitted light (P 0.65/0.1) was 0.88.

Also, the transmission bandwidth under conditions of 50 m length and NA of 0.3 was 213 MHz, and the multicore plastic optical fiber cable was found to have an excellent transmission bandwidth. Detailed results are shown in Table 1.

Example 2

A multicore plastic optical fiber was prepared the same as in Example 1 except that the cladding material was a copolymer of VdF/TFE/HFP (48/43/9 mass %) (refractive index: 1.375, crystal fusion heat: 14 mJ/mg). The occupancy rate of the total cross-sectional area of cores was 87.0/% of the cross section of the multicore optical fiber, and the occupancy rate of the total cross-sectional area of cores was 85.9% of the outer region in the cross section of the multicore optical fiber.

A 2.2 mm-diameter optical fiber cable obtained by coating polyethylene on the periphery of the multicore plastic optical fiber was cut into 1 m lengths. When the amount of emitted light from the other end was measured the same as in Example 1, the results were respectively 250.8 nA (P0.1) and 218.4 nA (P0.65), and the ratio of the amounts of transmitted light (P0.65/0.1) was 0.87. High light-receiving capacity was found to be maintained when incident light of both high and low numerical apertures entered the multicore plastic optical fiber. Detailed results are shown in Table 1.

Example 3

Figure 6:
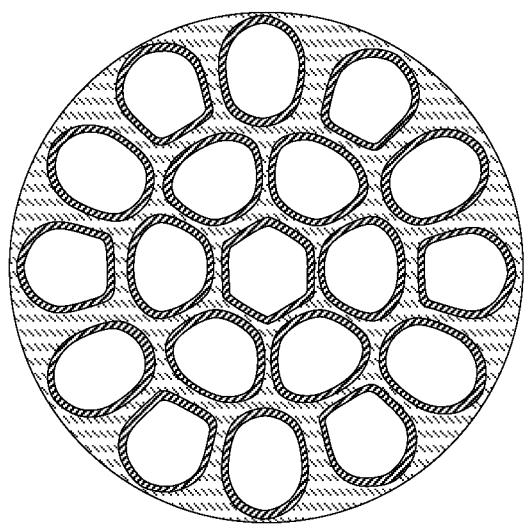
FIG. 6 is a cross-sectional view of a multicore optical fiber in Example 3.

A multicore plastic optical fiber was prepared the same as in Example 1 except that a spinning nozzle had nozzle holes arranged in a concentric array. The occupancy rate of the total cross-sectional area of cores was 82.0% of the cross section of the multicore optical fiber, and the occupancy rate of the total cross-sectional area of cores was 80.3% of the outer region in the cross section of the multicore optical fiber. FIG. 6 shows a schematic cross-sectional shape of the obtained multicore plastic optical fiber.

A 2.2 mm-diameter optical fiber cable obtained by coating polyethylene on the periphery of the multicore plastic optical fiber was cut into 1 m lengths. When the amount of emitted light from the other end was measured the same as in Example 1, the results were respectively 245.3 nA (P0.1) and 200.3 nA (P0.65), and the ratio of the amounts of transmitted light (P0.65/0.1) was 0.82. Detailed results are shown in Table 1.

Example 4

A multicore plastic optical fiber was prepared the same as in Example 1 except that the material for cladding and the sea was a copolymer of VdF/TFE (80/20 mol %) (refractive index: 1.402, crystal fusion heat: 60 mJ/mg). The occupancy rate of the total cross-sectional area of cores was 87.8% of the cross section of the multicore optical fiber, and the occupancy rate of the total cross-sectional area of cores was 87.6% of the outer region in the cross section of the multicore optical fiber.

A 2.2 mm-diameter optical fiber cable obtained by coating polyethylene on the periphery of the multicore plastic optical fiber was cut into 1 m lengths. When the amount of emitted light from the other end was measured the same as in Example 1, the results were respectively 253.1 nA (P0.1) and 212.5 nA (P0.65), and the ratio of the amounts of transmitted light (P0.65/0.1) was 0.84. Detailed results are shown in Table 1.

Example 5

A multicore plastic optical fiber was prepared the same as in Example 1 except that the amounts of core material, cladding material and sea material discharged respectively from resin supply pumps to the spinning nozzle were adjusted so that the supplied amount of the polymer core material was reduced by 2%, the supplied amount of the polymer cladding material was reduced by 40% and the supplied amount of the polymer sea material was increased by 44% (relative to their respective amounts in Example 1). The occupancy rate of the total cross-sectional area of cores was 83.8% of the cross section of the multicore optical fiber, and the occupancy rate of the total cross-sectional area of cores was 75.9% of the outer region in the cross section of the multicore optical fiber.

A 2.2 mm-diameter optical fiber cable obtained by coating polyethylene on the periphery of the multicore plastic optical fiber was cut into 1 m lengths. When the amount of emitted light from the other end was measured the same as in Example 1, the results were respectively 245.1 nA (P0.1) and 180.3 nA (P0.65), and the ratio of the amounts of transmitted light (P0.65/0.1) was 0.74. Detailed results are shown in Table 1.

Comparative Example 1

A multicore plastic optical fiber was prepared the same as in Example 1 except that the amounts of core material, cladding material and sea material discharged respectively from resin supply pumps to the spinning nozzle were adjusted so that the supplied amount of polymer core material was reduced by 12%, the supplied amount of the polymer cladding material was increased by 40% and the supplied amount of the polymer sea material was increased by 93% (relative to their respective amounts in Example 1). The occupancy rate of the total cross-sectional area of cores was 76.0% of the cross section of the multicore optical fiber, and the occupancy rate of the total cross-sectional area of cores was 68.6% of the outer region in the cross section of the multicore optical fiber. The shape of cores in contact with the periphery of the optical fiber was a rectangular or pentagonal circle, with a greater curvature rate of the surface in contact with the periphery of the optical fiber.

A 2.2 mm-diameter optical fiber cable obtained by coating polyethylene on the periphery of the multicore plastic optical fiber was cut into 1 m lengths. When the amount of emitted light from the other end was measured the same as in Example 1, the results were respectively 205.5 nA (P0.1) and 145.1 nA (P0.65), and the ratio of the amounts of transmitted light (P0.65/0.1) was 0.71. The light attenuation was found to be significantly high when incident light entered at a high numerical aperture. Detailed results are shown in Table 1.

Comparative Example 2

A multicore plastic optical fiber was prepared the same as in Example 1 except that a spinning nozzle had 151 nozzle holes arranged in a hexagonal array and the amounts of core material, cladding material and sea material discharged respectively from the resin supply pumps to the spinning nozzle were adjusted so that the supplied amount of the polymer core material was increased by 13%, the supplied amount of the polymer cladding material was reduced by 79% and the supplied amount of the polymer sea material was reduced by 76% (relative to their respective amounts in Example 1). The shape of cores in contact with the periphery of the optical fiber was a rectangular or pentagonal ellipse, with a greater curvature rate of the surface in contact with the periphery of the optical fiber. The occupancy rate of the total cross-sectional area of cores was 98.5% of the cross section of the multicore optical fiber, and the occupancy rate of the total cross-sectional area of cores was 97.6% of the outer region in the cross section of the multicore optical fiber.

A 2.2 mm-diameter optical fiber cable obtained by coating polyethylene on the periphery of the multicore plastic optical fiber was cut into 1 m lengths. When the amount of emitted light from the other end was measured the same as in Example 1, the results were respectively 163.3 nA (P0.1) and 61.3 nA (P0.65), and the ratio of the amounts of transmitted light (P0.65/0.1) was 0.38. The light attenuation was found to be significantly high when incident light entered at a high numerical aperture. Detailed results are shown in Table 1.

Example 6

A multicore plastic optical fiber cable was obtained the same as in Example 1 except that an alloy of polypropylene/polyethylene/vulcanized rubber component (Milastomer 9070B, made by Mitsui Chemical) was used for an olefin-based thermoplastic elastomer to be coated on the periphery of the multicore plastic optical fiber obtained in Example 1. Using a 25-1 m cutback method, the transmission loss of the multicore plastic optical fiber cable was measured using a light with a wavelength of 650 nm at an NA of 0.1. The result was 152 dB/km. When the transmission loss of the multicore plastic optical fiber cable was measured after a thermal treatment was conducted under conditions of 105° C. for 3000 hours, it was 180 dB/km, and the cable was found to have high heat resistance. Detailed results are shown in Table 2.

Example 7

A multicore plastic optical fiber cable was obtained the same as in Example 1 except that a water-crosslinkable polyethylene precursor resin (Linklon XHM-611N, made by Mitsubishi Chemical) was used to coat the periphery of the multicore plastic optical fiber obtained in Example 1 and the precursor resin was crosslinked by being immersed for three hours in 98° C. hot water after the coating process. Using a 25-1 m cutback method, the transmission loss of the multicore plastic optical fiber cable was measured using a light with a wavelength of 650 nm at NA0.1. The result was 155 dB/km. When the transmission loss of the multicore plastic optical fiber cable was measured after a thermal treatment was conducted under conditions of 105° C. for 3000 hours, it was 175 dB/km, and the cable was found to have high heat resistance. Detailed results are shown in Table 2.

Examples 8 and 9

Multicore plastic optical fiber cables were prepared the same as in Examples 6 and 7 respectively except that the multicore plastic optical fiber obtained in Example 2 was used. The heat resistance and bandwidth properties of the cables were both excellent. Detailed results are shown in Table 2.

TABLE 1

| | Cladding Material | Sea Material | Occupancy Rate of Total Cross-sectional Area of Cores in Cross Section of Multicore Optical Fiber (%) | Occupancy Rate of Total Cross-sectional Area of Cores in Outer Region in Cross Section of Multicore Optical Fiber (%) | Amount of Transmitted Light (nA) | | Ratio: Amounts of Transmitted Light |
|---|---|---|---|---|---|---|---|
| | | | | | P0.1 | P0.65 | P0.65/P0.1 |
| Example 1 | FM1 | VDF/TFE/HFP | 86.6 | 81.6 | 249.2 | 219.4 | 0.88 |
| Example 2 | VDF/TFE/HFP | VDF/TFE/HFP | 87.0 | 85.9 | 250.8 | 218.4 | 0.87 |
| Example 3 | FM1 | VDF/TFE/HFP | 82.0 | 80.3 | 245.3 | 200.3 | 0.82 |
| Example 4 | VDF/TFE | VDF/TFE | 87.8 | 87.6 | 253.1 | 212.5 | 0.84 |
| Example 5 | FM1 | VDF/TFE/HFP | 83.8 | 75.9 | 245.1 | 180.3 | 0.74 |
| Comp. Example 1 | FM1 | VDF/TFE/HFP | 76.0 | 68.8 | 205.5 | 145.1 | 0.71 |

TABLE 1-continued

| | Cladding Material | Sea Material | Occupancy Rate of Total Cross-sectional Area of Cores in Cross Section of Multicore Optical Fiber (%) | Occupancy Rate of Total Cross-sectional Area of Cores in Outer Region in Cross Section of Multicore Optical Fiber (%) | Amount of Transmitted Light (nA) | | Ratio: Amounts of Transmitted Light |
|---|---|---|---|---|---|---|---|
| | | | | | P0.1 | P0.65 | P0.65/P0.1 |
| Comp. Example 2 | FM1 | VDF/TFE/HFP | 98.5 | 97.6 | 163.3 | 61.3 | 0.38 |

TABLE 2

| | Fiber | Coating Material | Transmission Loss (dB/km) | | | Bandwidth (MHz) |
|---|---|---|---|---|---|---|
| | | | Initial | After Test | Difference | |
| Example 6 | Example 1 | PP/PE/EPDM | 152 | 130 | +28 | 213 |
| Example 7 | Example 1 | XPE | 155 | 175 | +20 | 205 |
| Example 8 | Example 2 | PP/PE/EPDM | 143 | 175 | +32 | 213 |
| Example 9 | Example 2 | XPE | 150 | 184 | +34 | 208 |

DESCRIPTION OF NUMERICAL REFERENCES 1 core
2 cladding
3 sea portion

What is claimed is:

1. A multicore optical fiber, comprising:
a plurality of cores; and
a sea portion formed around each core,
wherein the multicore optical fiber satisfies at least condition (1) and (2) below:
(Condition 1): an occupancy rate of a total cross-sectional area of cores is in the range of 80 to 95% of an outer region in a cross section of a multicore optical fiber; and
(Condition 2): the occupancy rate of the total cross-sectional area of cores is in the range of 82 to 93% of the cross section of a multicore optical fiber, and
wherein the outer region is a region sandwiched between a periphery of the multicore optical fiber and a periphery of a concentric circle that is formed at a center of the multicore optical fiber having a substantially circular cross section and has a diameter that is 60% of a fiber diameter.

2. The multicore optical fiber according to claim 1, wherein the material for cores is a copolymer of polymethyl methacrylate or methyl methacrylate and at least one monomer other than methyl methacrylate.

3. The multicore optical fiber according to claim 1, wherein the material for the sea portion is a fluorine-based resin containing at least a vinylidene fluoride unit and having a crystal fusion heat of 70 mJ/mg or lower determined through differential scanning calorimetry.

4. The multicore optical fiber according to claim 1, wherein at least one layer of cladding is formed on the periphery of each core.

5. The multicore optical fiber according to claim 4, wherein the material for cladding contains at least a fluorinated methacrylate unit.

6. A method for producing the multicore optical fiber according to claim 1 by melt-spinning 82 to 93 mass % of a core material and 7 to 18 mass % of a sea material.

7. The method for producing a multicore optical fiber according to claim 6 by melt-spinning materials using a nozzle having nozzle holes arranged in a hexagonal array.

8. A method for producing the multicore optical fiber according to claim 1 by melt-spinning 82 to 93 mass % of a core material, 0.1 to 8 mass % of a cladding material, and 6.9 to 17.9 mass % of a sea material.

9. A multicore optical fiber cable comprising a coating layer on the periphery of the multicore optical fiber according to claim 1.

10. An optical communication system comprising the multicore optical fiber according to claim 1.

11. An optical fiber sensor comprising the multicore optical fiber according to claim 1.

12. An optical fiber light comprising the multicore optical fiber according to claim 1.

* * * * *